(12) United States Patent
Koskela et al.

(10) Patent No.: US 12,289,625 B2
(45) Date of Patent: Apr. 29, 2025

(54) M-TRP BEAM FAILURE INDICATION

(71) Applicant: Nokia Technologies Oy, Espoo (FI)

(72) Inventors: Timo Koskela, Oulu (FI); Samuli Heikki Turtinen, Ii (FI)

(73) Assignee: Nokia Technologies Oy, Espoo (FI)

( * ) Notice: Subject to any disclaimer, the term of this patent is extended or adjusted under 35 U.S.C. 154(b) by 365 days.

(21) Appl. No.: 17/999,606

(22) PCT Filed: Mar. 10, 2021

(86) PCT No.: PCT/FI2021/050173
§ 371 (c)(1),
(2) Date: Nov. 22, 2022

(87) PCT Pub. No.: WO2021/240051
PCT Pub. Date: Dec. 2, 2021

(65) Prior Publication Data
US 2023/0199529 A1    Jun. 22, 2023

Related U.S. Application Data

(60) Provisional application No. 63/030,523, filed on May 27, 2020.

(51) Int. Cl.
*H04W 24/04* (2009.01)
*H04W 74/08* (2024.01)
*H04W 74/0833* (2024.01)

(52) U.S. Cl.
CPC ....... *H04W 24/04* (2013.01); *H04W 74/0833* (2013.01)

(58) Field of Classification Search
CPC ............ H04L 5/0091; H04W 74/0833; H04W 24/04; H04B 7/06964
See application file for complete search history.

(56) References Cited

U.S. PATENT DOCUMENTS

| 12,088,395 | B2 * | 9/2024 | Tran ..................... H04W 72/23 |
| 2019/0215048 | A1 | 7/2019 | Cirik et al. |
| 2019/0379506 | A1 | 12/2019 | Cheng |
| 2020/0137821 | A1 | 4/2020 | Cirik et al. |

(Continued)

FOREIGN PATENT DOCUMENTS

WO    2020063126 A1    4/2020

OTHER PUBLICATIONS

Extended European Search Report received for corresponding European Patent Application No. 21811750.5, dated Sep. 14, 2023, 9 pages.

(Continued)

*Primary Examiner* — Brian D Nguyen
(74) *Attorney, Agent, or Firm* — Brake Hughes Bellermann LLP

(57) ABSTRACT

There is provided a method for a user equipment for detecting a beam failure on at least one transmission/reception point, TRP, the UE being configured to communicate with a plurality of TRPs; based on the detecting, encoding a beam failure indication data to a beam failure recovery, BFR, media access control, MAC, control element, CE, wherein the beam failure indication data indicates the beam failure on the at least one TRP; and transmitting the BFR MAC CE to a network element of a wireless communication network.

11 Claims, 7 Drawing Sheets

(56) References Cited

U.S. PATENT DOCUMENTS

| | | | |
|---|---|---|---|
| 2022/0377586 A1* | 11/2022 | Yang | H04L 5/0048 |
| 2023/0006727 A1* | 1/2023 | Jang | H04L 5/0051 |
| 2023/0046074 A1* | 2/2023 | Zhang | H04L 5/0053 |
| 2023/0156845 A1* | 5/2023 | Khoshnevisan | H04L 5/001 370/216 |
| 2023/0164863 A1* | 5/2023 | Xu | H04B 7/0695 370/329 |

OTHER PUBLICATIONS

"Miscellaneous corrections on eMIMO", 3GPP TSG-RAN WG2 Meeting #109bis-e, R2-2003911, Samsung, Apr. 20-30, 2020, 141 pages.

"New WID: Further enhancements on MIMO for NR", 3GPP TSG RAN Meeting #86, RP-193133, Agenda: 9.1.1, Samsung, Dec. 9-12, 2019, 5 pages.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

International Search Report and Written Opinion received for corresponding Patent Cooperation Treaty Application No. PCT/FI2021/050173, dated May 27, 2021, 17 pages.

"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.

"Remaining issues on beam failure recovery", 3GPP TSG RAN WG1 Meeting #92, R1-1801454, Agenda: 7.1.2.2.4, Huawei, Feb. 26-Mar. 2, 2018, 8 pages.

Office action received for corresponding European Patent Application No. 21811750.5, dated May 29, 2024, 4 pages.

Office Action for Indonesia Patent Application No. P00202215214, mailed on Feb. 25, 2025, 6 pages.

3GPP TS 38.321, V16.0.0; 3rd Generation Partnership Project; Technical Specification Group Radio Access Network; NR; Medium Access Control (MAC) protocol specification (Release 16); Mar. 2020; 141 pages.

3GPP TSG RAN WG1 Meeting #92, R1-1801454; "Remaining Issues on Beam Failure Recovery"; Agenda Item: 7.1.2.2.4; Source: Huawei, HiSilicon; Athens, Greece; Feb. 26-Mar. 2, 2018; 8 pages.

* cited by examiner

M-TRP BEAM FAILURE INDICATION

This application was originally filed as a Patent Cooperation Treaty Application No. PCT/FI2021/050173 filed on Mar. 10, 2021, which claims priority from U.S. Provisional Patent Application No. 63/030,523 filed on May 27, 2020, each of which are hereby incorporated in their entirety.

TECHNICAL FIELD

The invention relates to communications.

BACKGROUND

Modern wireless networks are capable of utilizing Multi-Transmission/Reception Point (M-TRP) schema. As such capabilities are increasing, there is a demand for providing solutions that enhance overall effectiveness of such capabilities. For example, it may be beneficial to provide solutions that relate to solving problems caused by beam failures in M-TRP scenario.

BRIEF DESCRIPTION

According to an aspect, there is provided the subject matter of the independent claims. Some embodiments are defined in the dependent claims.

According to an aspect, there is provided an apparatus comprising at least one processor, and at least one memory including program code, wherein the at least one memory and the computer program code are configured, with the at least one processor, to cause the apparatus to perform operations comprising: detecting a beam failure on at least one transmission/reception point, TRP, the apparatus being configured to communicate with a plurality of TRPs; based on the detecting, encoding a beam failure indication data to a beam failure recovery, BFR, media access control, MAC, control element, CE, wherein the beam failure indication data indicates the beam failure on the at least one TRP; and transmitting the BFR MAC CE to a network element of a wireless communication network.

According to an aspect, there is provided an apparatus comprising at least one processor, and at least one memory including program code, wherein the at least one memory and the computer program code are configured, with the at least one processor, to cause the apparatus to perform operations comprising: configuring a user equipment, UE, of a wireless communication network to monitor beam failure on at least one of a plurality of transmission/reception points, TRPs, the UE being configured to communicate with the plurality of TRPs, wherein the configuring causes the UE to encode, based on detecting a beam failure, beam failure indication data indicating a beam failure on at least one TRP to a beam failure recovery, BFR, media access control, MAC, control element, CE, and to transmit the BFR MAC CE to the wireless network.

The embodiments that do not fall under the scope of the claims are to be interpreted as examples useful for understanding the disclosure.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1A:
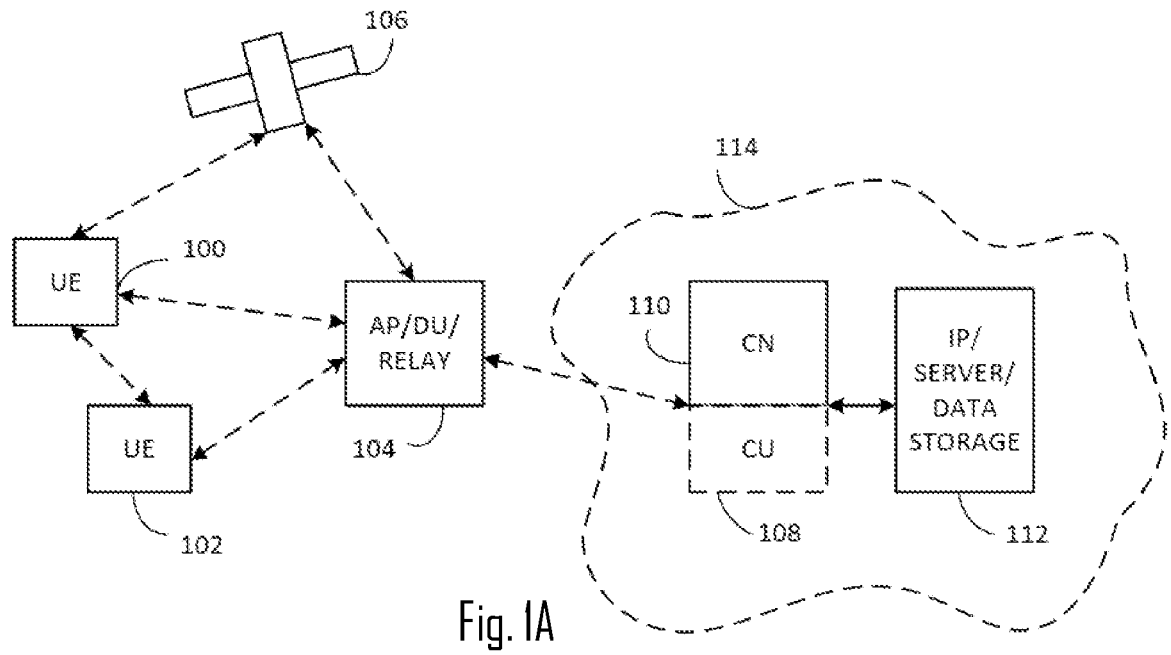
FIG. 1A illustrates an example of a wireless communication system to which embodiments may be applied.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof. FIG. 1A depicts examples of simplified system architectures only showing some elements and functional entities, all being logical units, whose implementation may differ from what is shown. The connections shown in FIG. 1A are logical connections; the actual physical connections may be different. It is apparent to a person skilled in the art that the system typically comprises also other functions and structures than those shown in FIG. 1A.

The embodiments are not, however, restricted to the system given as an example but a person skilled in the art may apply the solution to other communication systems provided with necessary properties. The example of FIG. 1A shows a part of an exemplifying radio access network. FIG. 1A shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications.

The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobility management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1A) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1A by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1A may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1A). A HNB Gateway (HNB-GW), which is typically installed within an operator's network may aggregate traffic from a large number of HNBs back to a core network. The network discussed herein may refer to, for example, cellular network such as 5G and the like.

UE may be capable of performing Beam Failure Recovery (BFR) either using Contention Free Random Access (CFRA) or Contention Based Random Access (CBRA). In CFRA BFR, the UE may be provided with dedicated Random Access (RA) preamble resources that may correspond to a specific downlink (DL) Reference Signal (RS) (i.e. a new candidate beam). CFRA BFR may therefore indicate network that a beam failure has been declared, UE has initiated recovery, and selected a new candidate beam. Further, Secondary Cell (SCell) BFR may be used so that in case of an SCell beam failure, UE may transmit a Medium Access Control (MAC) Control Element (CE) that may indicate network the failed SCell index and a further indication if a suitable candidate beam has been detected (e.g. the quality and/or received signal strength of the candidate beam exceeds a threshold level), and an index of the candidate beam RS in the candidate beam RS list. Transmission of MAC CE may be preceded by a transmission of dedicated SR signal that may indicate, on the SCell, beam failure event, but the MAC CE may also be multiplexed to any UL grant.

Figure 4A:
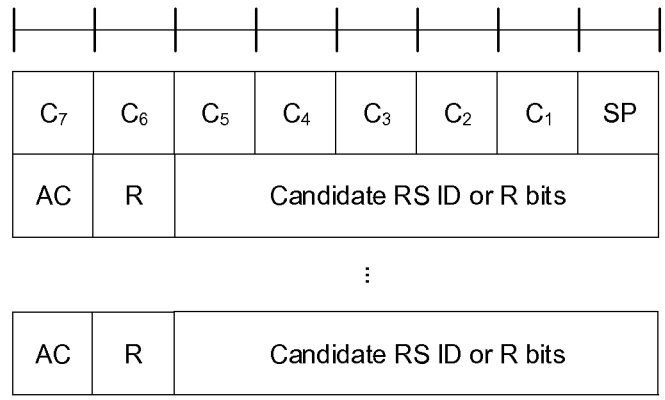
FIGS. 4A and 4B illustrate MAC CE data structures.
Figure 4B:
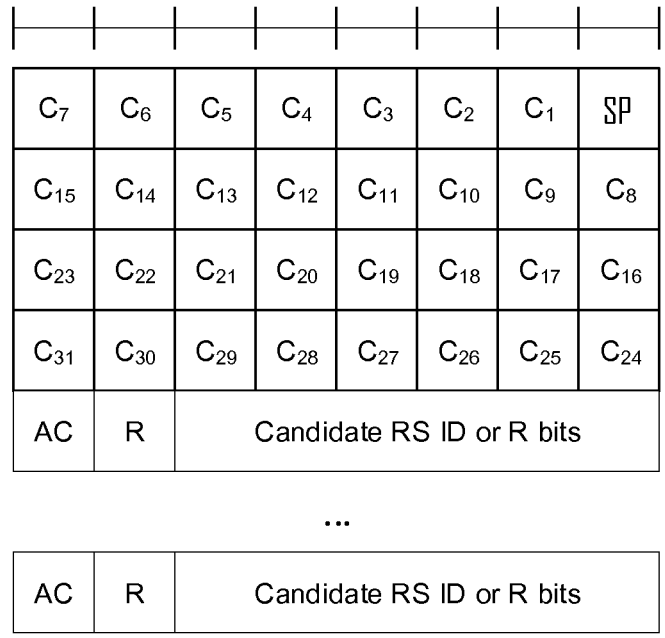

It is noted that when reference is made to BFR MAC CE it may refer to BFR MAC CE or to truncated BFR MAC CE or a MAC CE used for beam failure recovery. If reference is made explicitly to truncated BFR MAC CE, the reference may be applicable to truncated BFR MAC CE, but not necessarily to BFR MAC CE. FIG. 4A shows an example of a BFR and truncated BFR MAC CE with single octet bitmap and FIG. 4B shows an example of a BFR and truncated BFR MAC CE with four octets bitmap. These Figures are used as examples to describe some of the features and data structure of the BFR MAC CEs utilized in the context of this application. In general, the below described MAC CEs may be used to indicate SpCell failure. Skilled person understands that SpCell may refer to a primary cell of a master cell group or a primary secondary cell of a secondary cell group. It is further noted that PCell may refer to SpCell of a master cell group and PSCell may refer to SpCell of a secondary cell group.

The BFR MAC CEs may be identified by a MAC subheader with Logical Channel ID (LCID)/eLCID. BFR MAC CE may have a variable size. It may include a bitmap and in ascending order based on the ServCellIndex, beam failure recovery information i.e. octets containing candidate beam availability indication (AC) for SCells indicated in the bitmap.

For BFR MAC CE, a single octet bitmap may be used when the highest ServCellIndex of this MAC entity's SCell for which beam failure is detected is less than 8, otherwise four octets may be used. For Truncated BFR MAC CE, a single octet bitmap (see example of FIG. 4A) may be used for the following cases, otherwise four octets (see example of FIG. 4B) may be used:

the highest ServCellIndex of this MAC entity's SCell configured with beam failure detection is less than 8; or beam failure is detected for SpCell and the SpCell is to be indicated in a truncated BFR MAC CE and the Uplink Shared Channel (UL-SCH) resources available for transmission cannot accommodate the Truncated BFR MAC CE with the four octets bitmap plus its subheader as a result of Logical Channel Prioritization (LCP).

The fields in the BFR MAC CEs may be defined as follows with reference to FIGS. 4A and 4B:

SP: This field may indicate beam failure detection for the SpCell of this MAC entity. The SP field may be set to 1 to indicate that beam failure is detected for SpCell only when BFR MAC CE or Truncated BFR MAC CE is to be included into a MAC PDU as part of Random Access Procedure, otherwise, it is set to 0.

Ci (BFR MAC CE): This field may indicate beam failure detection and the presence of an octet containing the AC field for the SCell with ServCellIndex i. The Ci field set to 1 indicates that beam failure is detected and the octet containing the AC field is present for the SCell with ServCellIndex i. The Ci field set to 0 indicates that the beam failure is not detected and octet containing the AC field is not present for the SCell with ServCellIndex i. The octets containing the AC field are present in ascending order based on the ServCellIndex;

Ci (Truncated BFR MAC CE): This field indicates beam failure detection for the SCell with ServCellIndex i. The Ci field set to 1 indicates that beam failure is detected and the octet containing the AC field for the SCell with ServCellIndex i may be present. The Ci field set to 0 indicates that the beam failure is not detected and the octet containing the AC field is not present for the SCell with ServCellIndex i. The octets containing the AC field, if present, are included in ascending order based on the ServCellIndex. The number of octets containing the AC field included is maximized, while not exceeding the available grant size;

AC: This field may indicate the presence of the Candidate RS ID field in this octet. If at least one of the Synchronization Signal Blocks (SSBs) with Synchronization Signal reference signal received power (SS-RSRP) above rsrp-ThresholdBFR amongst the SSBs in candidateBeamRSSCellList or the Channel State Information (CSI)-RSs with CSI-RSRP above rsrp-ThresholdBFR amongst the CSI-RSs in candidateBeamRSSCellList is available, the AC field is set to 1; otherwise, it is set to 0. If the AC field set to 1, the Candidate RS ID field is present. If the AC field set to 0, R bits are present instead;

Candidate RS ID: This field is set to the index of an SSB with SS-RSRP above rsrp-ThresholdBFR amongst the SSBs in candidateBeamRSSCellList or to the index of a CSI-RS with CSI-RSRP above rsrp-ThresholdBFR amongst the CSI-RSs in candidateBeamRSSCellList. The length of this field is 6 bits.

R: Reserved bit, set to 0.

However, it is noted that presently the AC, R, Candidate RS ID byte (i.e. AC, R, and Candidate RS ID fields) are not present when indicating BFR on SpCell. I.e. there is no such information encoded into the BFR MAC CE for SpCell.

Figure 1B:
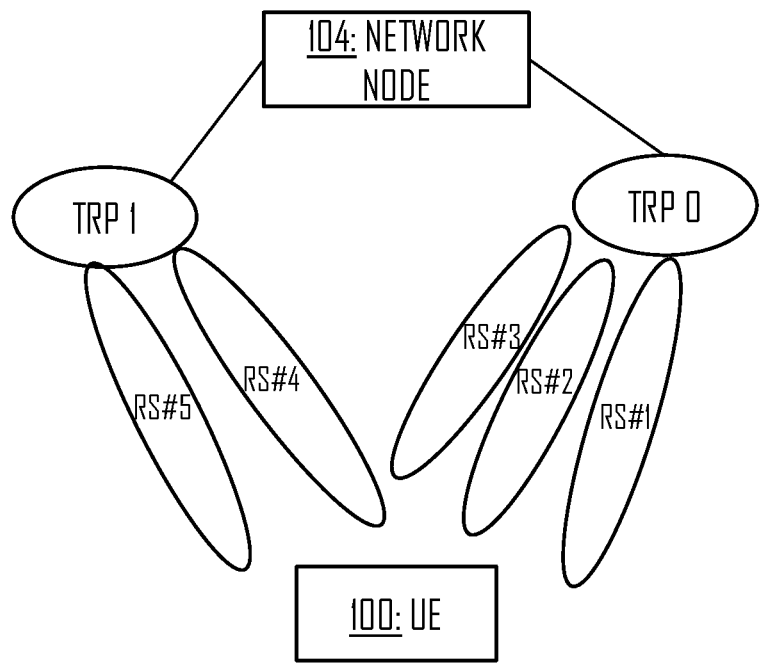
FIG. 1B illustrates an example of a wireless communication system to which embodiments may be applied.

The described network (e.g. FIG. 1A) may further support utilizing multiple transmission points (TRPs) (i.e. Multi-Transmission/Reception Point (M-TRP)). M-TRP may support, for example, up to two (2) TRPs, but the number of TRPs may not be limited to two. Thus, for example, the UE 100, 102 may receive data via a plurality of TRPs. The different TRPs could be controlled, for example, by the network node 104. Example of such as system is given in FIG. 1B which may be understood to depict the same system as FIG. 1A, but with greater accuracy with respect to the M-TRP scenario. The M-TRP operation may be implemented in such a manner that instead of explicitly indicating the TRP identifier (ID), the CORESETs may be associated to specific TRPs using a CORESETPoolIndex parameter [0.1]. CORESETs within a Physical Downlink Control Channel (PDCCH)-config that have the same poolIndex may be assumed by the UE to be configured to be provided from the same TRP. Referring to FIG. 1B, TRPs with CORESETPoolIndex 0 and 1 are shown, wherein the TRP having CORESETPoolIndex 0 provides three beams (RS #1, RS #2, and RS #3) and the TRP having CORESETPoolIndex 1 provides two beams (RS #4, and RS #5). M-TRP may also be configured for inter-cell scenario i.e. the TRPs (sometimes referred to as inter-cell M-TRP) may be associated with different cells. In inter-cell M-TRP UE may be provided a configuration where the CORESETs of CORESETPoolIndex/TRP are provided by multiple cells (e.g. two). In some examples, UE may be explicitly configured with CORESETs with more than one (e.g. two) distinct CORESETPoolIndex values that CORESETs or the CORESETpoolIndex is associated with another cell than the current serving cell (e.g. associating a CORESET/Poolindex with a Physical Cell Identity (PCI)). In some examples, UE may determine that it is configured with inter-cell (M-TRP) communication when the downlink reference signal indicated by an activated TCI State for PDCCH/PDSCH for a CORESET is associated or the quasi co-location (QCL) (source of the signal is associated with a PCI other than the current serving cell. These should be understood as illustrative examples.

However, although M-TRP operation has been introduced and techniques for BFR indication exist, there has been no developments in increasing the usability M-TRP with respect to beam failure detection and/or BFR with respect to M-TRP. For example, if one of the beams (i.e. having RS #1, RS #2, RS #3, RS #4, or RS #5) fails, an efficient and reliable concept of how it is indicated to the network is missing.

For example, if UE 100 (e.g. configured for PDCCH reception and/or configured for beam failure detection) is served via beams RS #1 and RS #4 and RS #1 fails, the UE 100 may determine that is has experienced failure on subset of beams. This may be referred to as partial beam failure. It may be possible to recover from such partial beam failure by utilizing beams RS #2 or RS #3. However, there is no known process for this and typically all the beams configured for failure detection have to be in failure condition for the recovery process to be initiated. When all beams (i.e. all the Beam Failure Detection Reference Signal (BFD-RS) or all the reference signals in the failure detection set, i.e. in the set q0) are in failure condition it may be referred to as beam failure or in some cases full failure or full beam failure.

In another example, if UE is configured to monitor beam failure on one or more beam failure detection resource sets (e.g. BFD-RS set #0 and set #1) and all the RS in all the sets are in failure condition, UE may determine that full beam failure has occurred/detected. In another example, if UE experiences failure on set #0 it may determine a partial failure or a failure on set #0. In some cases, if a failure is detected on set #1 UE may declare partial failure. In some cases, if a failure is detected on set #0 (but not on #1) UE may declare partial failure but if the failure is detected only on set #1 UE may not declare partial failure. Further, beam failure may happen if both RS #1 and RS #4 fail. It may also be possible to recover from this via RS #2/3 and RS #5. Again, no process for this has yet been described. Hence, there is provided a solution for M-TRP beam failure indication or for a failure indication where a subset of failure detection reference signals are determined to be in failure condition (e.g. based on hypothetical PDCCH BLER) or for failure where at least one of the beams (e.g. PDCCH beams, or beam failure detection reference signals) associated with a CORESET(s) of a specific CORESETPoolIndex are in failure or have failed. The solution enables the use of unused, or re-interpret specific or define specific, BFR MAC CE fields for SpCell for encoding indication about beam failure on at least one TRP amongst a plurality of TRPs. It should be noted that, in general, the described methods may be used for any MAC CE, MAC CE for beam failure recovery, PUCCH or PUSCH signaling used for failure recovery or indication of a failure. This may improve communication efficiency, and help the UE to recover more efficiently from a beam failure situation. For example, instead of indicating only that the whole cell has failed, the UE may indicate on the presently unused resources that one or many of TRPs, utilized by the UE, have failed. These TRPs may be provided via one or more cells. Hence, the accuracy of the indication and therefore the efficiency of the recovery may be enhanced from the known solutions which do not address M-TRP beam failure indication and recovery at all. It should be further noted that any method herein may also be used for failure recovery (according to the embodiments herein) for one or more SCell(s). In some examples, the failure may be indicated for both SpCell and one or more SCells or simply any method herein can be used for failure indication and/or providing additional information on the failure (e.g. failed TRP, candidate beam information, full/partial failure). Any of the embodiments herein may describe a method for: indicating the failure, recovering from the failure, or both.

Figure 2:
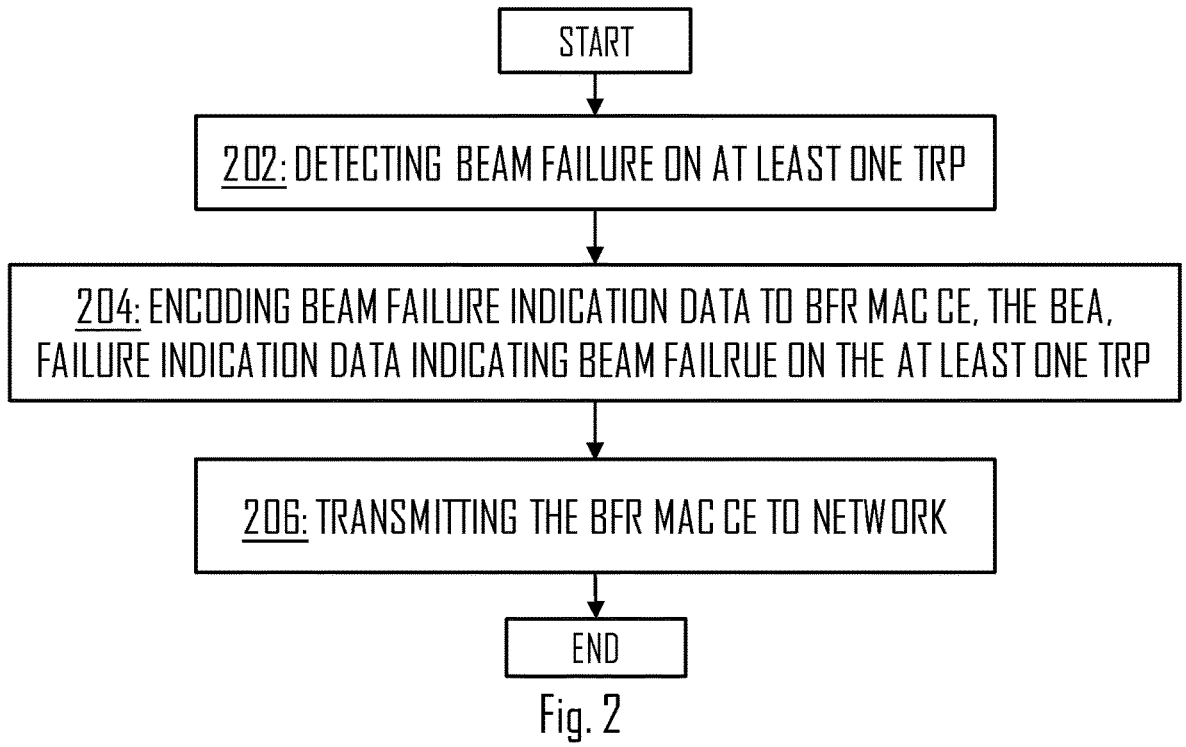
FIGS. 2 and 3 illustrate flow diagrams according to some embodiments.

FIG. 2 illustrates a flow diagram according to an embodiment. Referring to FIG. 2, a method for a UE of a wireless communication network is provided, the method comprising: detecting a beam failure on at least one TRP, the UE being configured to communicate with a plurality of TRPs (block 202); based on the detecting, encoding a beam failure indication data to a BFR MAC CE, wherein the beam failure indication data indicates the beam failure on the at least one TRP (block 204); and transmitting the BFR MAC CE to a network element of the wireless communication network (block 206).

Figure 3:
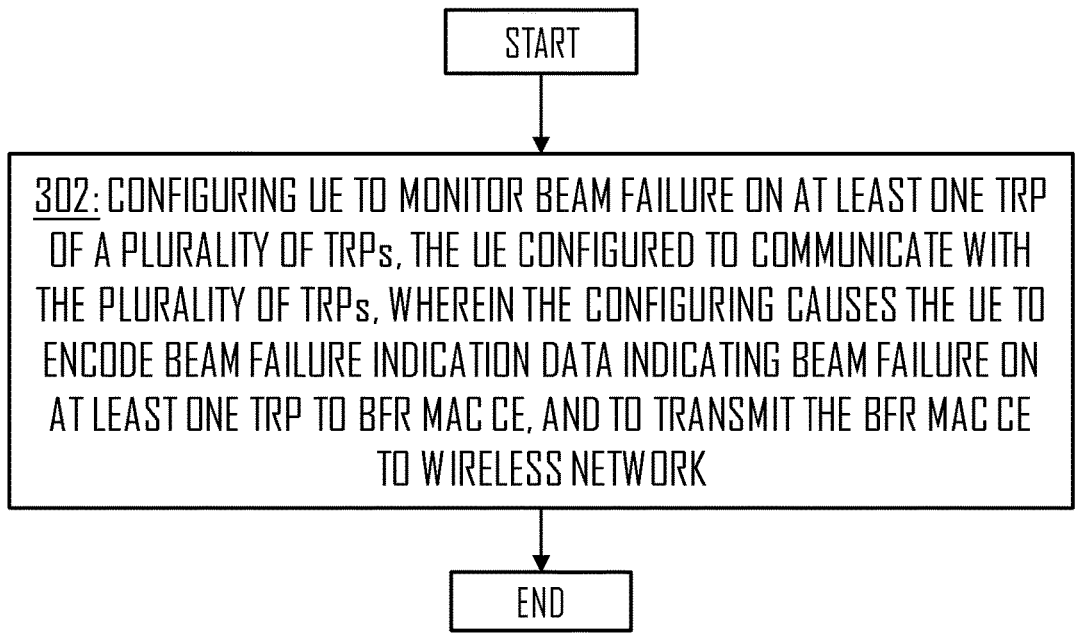

FIG. 3 illustrates a flow diagram according to an embodiment. Referring to FIG. 3, a method for a network element of a wireless communication network is provided, the method comprising: configuring a UE of the wireless communication network to monitor beam failure on at least one of a plurality of TRPs, the UE being configured to communicate with the plurality of TRPs, wherein the configuring causes the UE to encode, based on detecting a beam failure, beam failure indication data indicating a beam failure on at least one TRP (or a failure detection resource set) to a BFR MAC CE, and to transmit the BFR MAC CE to the wireless network (e.g. to the network element that configures the UE or to some other network element) (block 302).

The described methods of FIGS. 2 and 3 may be applicable in the system(s) of FIGS. 1A and 1B, for example. The UE discussed with respect to FIGS. 2 and 3 may be, for example, UE 100, or UE 102, or some other similar network device. The network element discussed with respect to FIGS. 2 and 3 may refer to network node 104, for example. TRPs may, for example, be controlled and/or utilized by the network node 104 to realize the M-TRP communication to the UE 100 or UE 102. The proposed solution enables the UE to indicate, in M-TRP scenario, beam failure so that, for example, the BFR MAC CE indicates the specific TRP or TRPs that has/have failed. In some examples the BFR MAC CE may be used to indicated that specific set of failure detection resources (BFD-RS), that may be associated with one or more TRPs, have failed. For example, if two TRPs are utilized by the UE, and one the TRPs is associated with beam failure (e.g. beam provided by the TRP and used by the UE fails), the BFR MAC CE may indicate that particular failed TRP. Hence, BFR can be readily triggered so that, for example, another beam of the same TRP is configured for the UE. It is noted that in such case, the UE may not totally loose communication to the network as, for example, another one of the two TRPs may still work as needed (i.e. is not associated with a beam failure). Hence, the BFR MAC CE may be transmitted via the other TRP or it is possible to perform random access procedure, such as CBRA, by the UE and to transmit the BFR MAC CE in the random access procedure. It is also possible to utilize the proposed solution to indicate that all TRPs (e.g. in the case that two TRPs are used) are associated with a beam failure, i.e. all TRPs have failed. In all cases it may be possible to indicate candidate beams (e.g. indicate RS index) by the UE to network (e.g. network element) in the BFR MAC CE so that the BFR can be performed also in the case that all TRPs fail.

At this point it is noted that the proposed solution is not limited to any specific method for determining a TRP associated failure. As an example of failure detection strategies that may take into account determining a beam failure in M-TRP scenario, UE may be configured, by the network, with a TRP specific set of q0 (i.e. failure detection resources; e.g. q0_#0 may equal to RSs of a certain TRP (e.g. having CORESETPoolIndex 0 in FIG. 1B) and q0_#1 may equal to RSs of a certain other TRP (e.g. having CORESETPoolIndex 1 in FIG. 1B)) and/or single q0 but indication may be determined based on the subset of RS in the set. In addition, there may be two failure detection procedures at MAC layer, one for each CORESETPoolIndex if two CORESETPoolIndex exists. If the number is higher, the number of procedures may also be higher, i.e. each TRP may be monitored for failure. In some examples the failure detection resources (e.g. a resource set) for a TRP or a CORESETPoolIndex may be determined based on the RS indicated by the activated TCI States for PDCCH (i.e. PDCCH beams) for a respective CORESET that is associated with a specific CORESETPoolIndex. Failure detection resource set, per CORESETPoolIndex or across CORESETPoolindexes may include one or more RS. After (or in response to) UE has determined a TRP specific failure at MAC layer, e.g. based on the set of q0_TRP0 and q0_TRP1 or has determined (partial) beam failure based on any TRP/CORESETPoolIndex specific failure detection mechanism, UE may trigger the TRP failure indication as explained above with respect to FIG. 2. The triggering the TRP failure indication may comprise, for example, steps 204 and 206 of FIG. 2 or any embodiments thereof. Regarding step 206, the transmission of the BFR MAC CE (sometimes referred to simply as MAC CE herein) may be performed as a part of CBRA. That is, the BFR MAC CE may be transmitted in Msg3 of the CBRA, or in MsgA in 2-step RACH, for example. Alternatively, the UE may multiplex the BFR MAC CE to an UL grant. The UL grant may refer to available UL grant or to an UL grant obtained via functional TRP.

For example, if one of the TRPs fail, a further UL grant may be obtained via the remaining TRP, for example. In some examples, UE may determine to select the random access resources on the failed TRP. In some examples, an association of e.g. CBRA resources and/or SSBs with a specific TRP may be provided for UE and may be used in random access resource selection. As an example UE may select any random access resources for providing the BFR MAC CE or it may select the random access resources associated with the failed TRP.

In one embodiment, in case of a partial beam failure, the UE transmits the BFR MAC CE on an UL grant or available UL resources (e.g., uplink shared channel (UL-SCH) resources). However, if UL grant/resources is not available, the UE may trigger Scheduling Request (SR) procedure. This way the UE may obtain resources for transmitting the BFR MAC CE if no UL grant(s) are available. In an embodiment, the UE uses the BFR SR resource associated with SCell BFR for requesting UL resources to transmit the BFR MAC CE. The BFR MAC CE may include the beam failure indication data indicating partial beam failure. For example, in full beam failure the UE may initiate the random access procedure. It is also possible to utilize the random access procedure in partial failure. In some cases it may be beneficial to utilize either existing UL grant or request resources, for example, with SR procedure.

In an embodiment, the UE is configured to perform operations comprising: triggering the transmission of BFR MAC CE (e.g. using CBRA procedure or a scheduling request procedure) if the beam failure is detected on all of the plurality of TRPs, if the beam failure is detected on a default TRP (e.g. CORESETPoolIndex equals 0), or if the beam failure is detected on a TRP configured (i.e. the network may configure this too be, for example, CORESETPoolIndex equals 0 or 1) to be monitored, by the UE, for a beam failure; BFR MAC CE may be transmitted, for example, using the UL grant as explained above, if not available, the CBRA process may be triggered to transmit the BFR MAC CE. e In one example, UE may use available UL grant to transmit the MAC CE (or PUSCH signaling for BFR) if the UL grant is transmitted on uplink resources associated with non-failed TRP.

It is noted that transmitting the BFR MAC CE in CBRA procedure may also be used in case of partial failure. For example, the UE may select resources from failed TRP, and thus indicate a new candidate via the CBRA procedure.

In an embodiment, the UE is configured to perform operations comprising: triggering the CBRA process if the beam failure is detected on all of the plurality of TRPs, if the beam failure is detected on a default TRP, or if the beam failure is detected on a TRP configured to be monitored, by the UE, for a beam failure. In a further embodiment, the UE may not trigger the CBRA process to transmit the BFR MAC CE.

Figure 5:
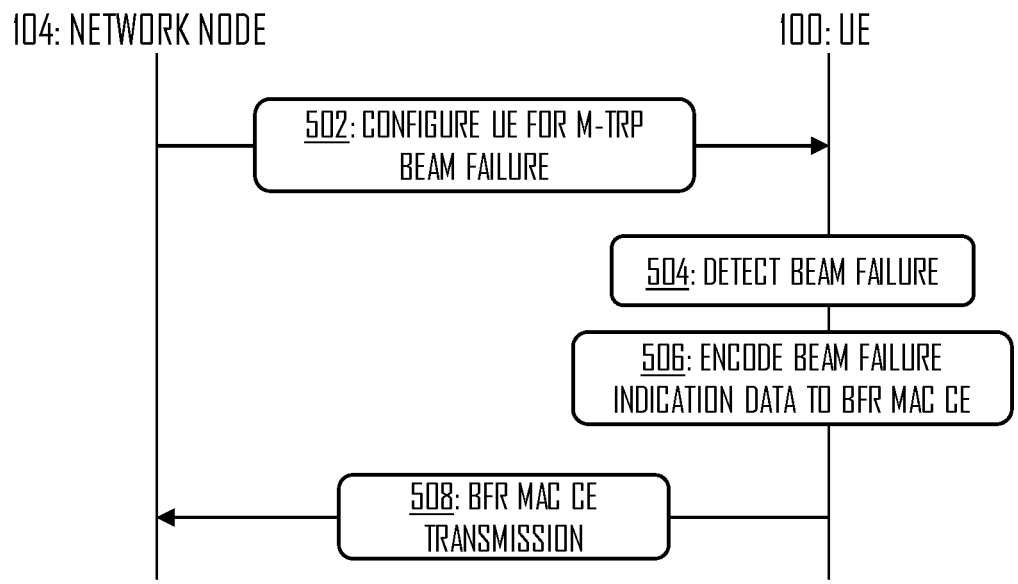
FIG. 5 illustrates a signal diagram according to an embodiment.

FIG. 5 illustrates a signal diagram according to an embodiment. Referring to FIG. 5, in block 502, the network node 104 may configure UE 100 for M-TRP beam failure indication. This configuration may be similar as discussed with reference block 302. That is, the network may indicate to the UE 100 how the UE 100 should monitor beam failure and how beam failure should be indicated if such failure is detected. As discussed above, the configuration may comprise, for example, configuring the UE to indicate full beam failure (i.e. beam failure is detected on all the TRPs) and partial beam failure (i.e. beam failure is detected on one of the TRPs). The network configuration may, for example, further comprise indication of what or which TRP(s) the UE should monitor for partial failure. For example, the network may configure the UE 100 to monitor default TRP (sometimes referred to as primary TRP), and/or to indicate partial failure with respect to the default TRP. Default TRP may refer to a CORESETPoolIndex configuration where in case a CORESETPoolIndex is not provided for a respective CORESET, a specific value such as '0' is used for that CORESET. Alternatively, such value may also be configured or agreed to be '1'. So, for example, the network may configure the UE 100 to indicate partial failure on CORESETPoolIndex=0. It may alternatively be possible that the network configures the UE 100 to monitor non-default TRP and/or to indicate partial failure with respect to the non-default TRP. So, for example, the network may configure the UE 100 to indicate partial failure on CORESETPoolIndex=1.

Based on the configuration received from the network node 104 or some other network element, the UE 100 may perform the M-TRP beam failure detection, monitoring and/or indication. In block 504, the UE 100 may detect beam failure (e.g. either full or partial failure). Based on the detection of block 504, the UE 100 may carry the encoding beam failure indication data to BFR MAC CE as shown in block 506.

In block 508, the BFR MAC CE may be transmitted from the UE to the network. In FIG. 5, the BFR MAC CE is transmitted to the network node 104. The transmission may be performed as a part of random access procedure (e.g. in Msg3 of CBRA) or using available or obtainable UL grant as was discussed above.

For example, if full beam failure is detected in block 504, in block 506 the UE 100 may encode the BFR MAC CE so that it indicates full beam failure. For example, if partial beam failure is detected in block 504, in block 506 the UE 100 may encode the BFR MAC CE so that it indicates the partial beam failure. In such case, the BFR MAC CE may indicate, for example, CORESETPoolIndex of the TRP associated with the beam failure (e.g. 0 or 1). Or, for example, if the network has configured the UE 100 to indicate partial failure on a certain CORESETPoolIndex (e.g. 0 or 1), the BFR MAC CE may simply indicate partial failure, and the network may determine to which TRP the beam failure relates to based on the previously made configuration.

It was briefly addressed above that the network may configure the UE 100 for encoding the beam failure indication data into the BFR MAC CE. For example, with reference to FIGS. 4A and 4B, this beam failure indication data may be encoded into one or more of the following fields of the BFR MAC CE: AC, R, and Candidate RS ID or R bits. As noted above, the BFR MAC CE may refer to non-truncated BFR MAC CE or to truncated BFR MAC CE. How the different field(s) are encoded is discussed in further detail with the help of some examples shown in FIGS. 6A to 6H later. The presence of the fields for SpCell dependent on the partial beam failure detection (BFD) being configured for the UE. E.g., if the partial BFD has not been configured, the fields are not encoded, while if the partial BFD is configured, the fields are encoded. In another example, when UE has been configured with multi-TRP or inter-cell M-TRP the fields for SpCell are encoded. In another example, when UE configured with, more than one distinct or with two distinct values of CORESETPoolIndexes, the field(s) are encoded. In yet another example when UE configured to perform failure detection on TRP basis, on CORESETPoolIndex basis or sub-set of BFD-RS (where there may be more than one set of failure detection resources) the fields are encoded. However, in an embodiment, the BFR MAC CE that is used to carry the beam failure indication data is a BFR MAC CE configured for indicating a failure of SpCell. Previously, said fields (i.e. AC, R, and Candidate RS ID or R bits) have been unused. The proposed solution therefore extends the usability of the BFR MAC CE for SpCell failure indication by utilizing the unused field(s) for indicating additionally beam failure per TRP or TRPs. It is also noted that although the present solution enables the use of the BFR MAC CE for SpCell failure indication for TRP related beam failure, the BFR MAC CE may also be used for the original purpose of indicating SpCell failure. For example, this can be made by encoding specified data into SP field of the BFR MAC CE (see e.g. FIG. 4A).

In any of the embodiments, the BFR MAC CE bit fields for SpCell, instead of referring to CORESETPoolIndex value or a TRP ID, the field or field(s) may point to a failure detection resource set. As an example, in case UE is configured to perform failure detection based on set #0 of BFD-RS and set #1 of BFD-RS, the field may indicate the failed set. As an example, in the failed set, all the RS need to be in failure condition to declare beam failure (or L1 to indicate beam failure instance indication to higher layer such as MAC). The BFD-RS sets may be associated respectively with TRP/CORESETPoolIndex (e.g. 0 and 1). In some examples, UE may be configured with multiple failure detection sets although only one CORESETPoolIndex is configured. As an example UE may be configured to perform failure detection on the BFD-RS that are assumed to be monitored from the same TRP (i.e. CORESETs are configured with same CORESETPoolIndex).

So, the network may configure the UE 100 at least with two different ways. In one embodiment, the network configures the UE 100 for encoding the beam failure indication data into the BFR MAC CE by configuring the UE 100 to indicate beam failure related to multiple TRPs (and hence multiple CORESETPoolIndexes as each TRP may correspond to a certain CORESETPoolIndex) and/or at least one TRP. So, the network may configure the UE 100 to perform full and/or partial beam failure indication.

In an embodiment, the UE is configured by a higher layer parameter (e.g. PDCCH-Config) for full and/or partial beam failure indication. For example, the PDCCH-Config may comprise two or more different values of CORESETPoolIndex in ControlResourceSet. Configuring may be performed by the network.

As also briefly discussed above, the configuring by the network may refer to configuring by the cellular network of FIG. 1A or 1B. Such configuration may be implemented by one or more network elements, such as the network node 104.

As addressed above, each TRP may be associated with a certain CORESETPoolIndex value or more specifically the CORESET configured with same PoolIndex are assumed from UE perspective to share same or similar properties e.g. transmitted from the same TRP. However, this does not mean necessarily that the network has to indicate a certain CORESETPoolIndex value or certain TRP to the UE to monitor. Instead the network may indicate to the UE that certain control resource sets that have the same CORESETPoolIndex share specific properties and UE may determine that M-TRP is configured when there are more than one or at least two distinct values of CORESETPoolIndexes configured. According to an embodiment, the UE encodes the beam failure indication data to the BFR MAC CE if it has been configured with more than one CORESETPoolindex values and BFR is detected. In an alternative example, UE encodes the indication data when it has been configured with more than one failure detection resource sets (e.g. two). These failure detection resource sets may be associated with TRPs/CORESETPoolIndexes of a cell (intra-cell multi-TRP) or multiple cells (e.g. inter-cell multi-TRP). Multiple failure detection resource sets may also be configured for single TRP/CORESETPoolIndex failure detection. So, if the UE has been configured by the network with two or more CORESETPoolindex values (or failure detection resource sets), the UE may encode said data into the BFR MAC CE as explained e.g. with respect to FIG. 2. The two CORESETPoolindex values should be different to each other. If on the other hand, the network configures the UE with one CORESETPoolindex value (i.e. not more than one CORESETPoolindex value or not more than one failure detection resource set), the UE may encode the BFR MAC CE so that it indicates a cell level failure (i.e. all beams associated with said one CORESETPoolIndex or a failure detection resource set fail) and the beam failure indication data fields may not be encoded at all (e.g. UE indicates only that SpCell has failed using the indication in the bitmap without any candidate information.

In one embodiment, the UE encodes the beam failure indication data to the BFR MAC CE if the UE is configured with more than one CORESETPoolIndex values and at least one of the CORESET or at least one of the CORESETPoolIndex is associated with PDCCH reception from a non-serving cell. This may mean that the proposed solution may be utilized in inter-cell scenario.

Figure 6A:
FIGS. 6A, 6B, 6C, 6D, 6E, 6F, and 6H illustrate some embodiments.

FIG. 6A illustrates an embodiment. Referring to FIG. 6A, AC 602, R 604, and candidate RS ID 606 fields are shown as illustrative examples. These fields may be similar as described above with reference to FIGS. 4A and 4B, i.e. fields comprised in the BFR MAC CE. It is noted that the proposed solution does not necessarily require the specific fields 602-606, and that similar solution may be realized with generic bit, bits, byte, and/or bytes. Hence, hereinafter field 602 is referred to as a second information element, field 604 is referred to as a first information element and field 606 is referred to as third information element. FIGS. 6B, 6C, 6D, 6E, 6F, and 6H illustrate some example embodiments of different ways to encode the beam failure indication data into the BFR MAC CE or similar entity. In the different example embodiments, it is noted that SP field of the BFR MAC CE may still be used to indicate failure on the cell level (e.g. current SpCell failure) or that there has been a TRP/CORESETPoolIndex/failure detection resource set specific failure for SpCell. In case of SCell failure in multi-TRP as described in the different example embodiments, UE may indicate the failed SCell index and encode additional indication data as described herein.

Figure 6B:
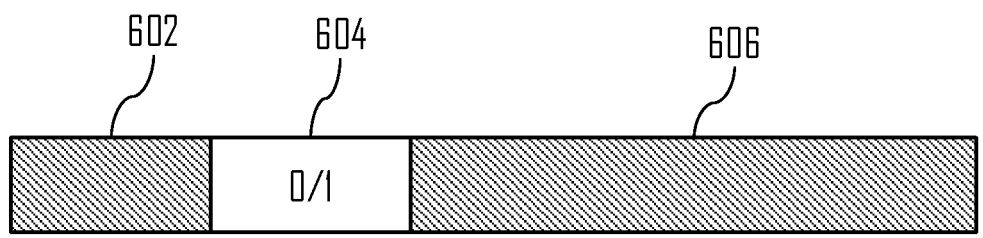

According to an embodiment, with reference to FIG. 6B, the beam failure indication data comprises a first information element 604 indicating whether the beam failure is full or partial. For example, the indication may be realized with one bit (e.g. 0 for full beam failure or 1 for partial beam failure). So, for example, if full failure is detected by the UE, said field 604 may not be set (thus may equal to 0), and thus the network may assume that full failure has occurred. As shown in FIG. 6B, fields 602 and 606 may not be encoded. However, in some embodiments they may be used of which some examples are given below. According to an embodiment, the network node 104 configures the UE to indicate whether full or partial beam failure has occurred. The indication may be performed by indicating the full or partial beam failure with the first information element 604 as explained above.

In an embodiment, the UE is configured (e.g. by the network node 104) to monitor beam failure of a specific TRP amongst the plurality of TRP, and wherein the first information element 604 indicates either full beam failure or beam failure of the specific TRP. So, for example, network may configure the UE to monitor beam failure related to a certain CORESETPoolIndex, and UE may report partial failure related to that CORESETPoolIndex. Failure may be declared based on BFD-RS associated with the CORESETS of the CORESETPoolIndex.

In an embodiment, said specific TRP is configured by the wireless communication network to the UE. E.g. the network may select the UE to monitor default or non-default TRP (e.g. BFD-RS associated with CORESETs of CORESETPoolIndex 0 or 1).

In an embodiment, said specific TRP is default TRP even if the network does not explicitly configure the UE to monitor default TRP. Hence, in this embodiment, the partial failure may be always the TRP associated with CORESETPoolIndex=0 or in other words, UE considers the partial failure detection based on the RS indicated by the active Transmission Configuration Indicator (TCI) State(s) for CORESETPoolindex=0.

In an embodiment, the UE is configured to report partial failure only on the CORESETs associated with CORESETPoolIndex equaling 0 or 1. Hence, in this embodiment, the UE does not indicate partial failure on both CORESETPoolIndexes.

Figure 6C:
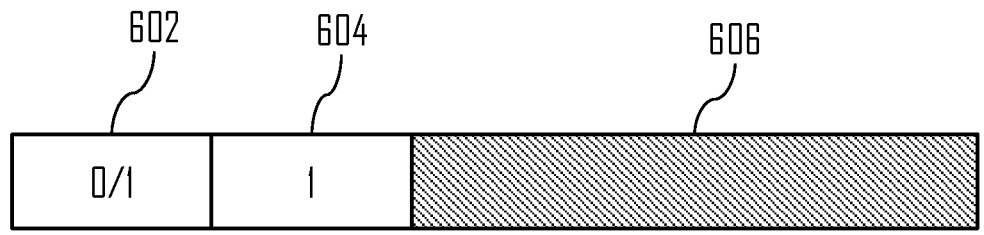

According to an embodiment, with reference to FIG. 6C, in case of a partial beam failure, the beam failure indication data comprises a second information element 602 (i.e. in addition to the first information element 604 indicating partial failure) indicating an index value of a TRP/CORESETPoolIndex associated with the partial beam failure. This index value may be the CORESETPoolIndex, for example. The CORESETPoolIndex value may be indicated, for example, with a bit if there are two TRPs that monitored for partial failure (i.e. 0 for one CORESETPoolIndex and 1 for another CORESETPoolIndex). If there are more CORESETPoolIndexes (and hence more TRPs), more than one bit may be used. It may be beneficial to indicate the CORESETPoolIndex as the network may not necessarily know to which CORESETPoolIndex the partial beam failure is related to. For example, the UE may thus indicate partial beam failure on CORESETPoolIndex equaling 0 or 1. In an embodiment, the second information element 602 indicates presence of a third information element 606 in the BFR MAC CE. Hence, the second information element does not necessarily indicate the CORESETPoolIndex value. In this embodiment, the third information element 606 may further indicate an index of a candidate beam for the failed CORESETPoolIndex that has been detected by the UE. Based on this information, the network may implicitly be indicated about the failed TRP also. The network may determine association between the candidate beam identifier and the failed TRP based on stored information, for example.

In an embodiment, with reference to FIG. 6C, in case of a partial beam failure, the beam failure indication data comprises a second information element 602 indicating whether there is a candidate beam exceeding a predetermined threshold. Predetermined threshold may be for example Reference Signal Receive Power (RSRP) threshold or Signal-to-interference-plus-noise ratio (SINR) threshold. Threshold may be configured by network, for example. This indication may be either 0 or 1, for example (i.e. one bit indication). As discussed in the previous embodiment, the third information element 606 may thus indicate one or more candidate beam identifiers for CORESETPoolIndex that is associated with the partial beam failure.

Figure 6D:
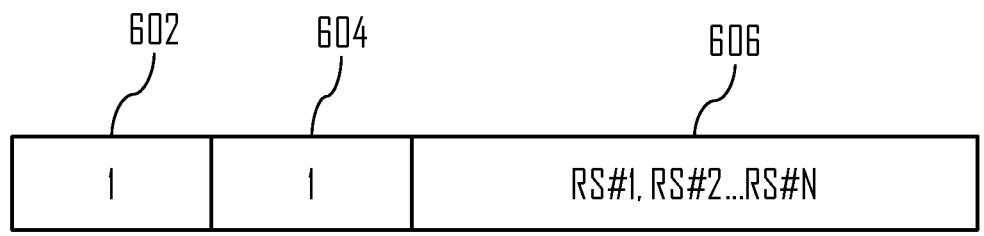
Figure 6E:
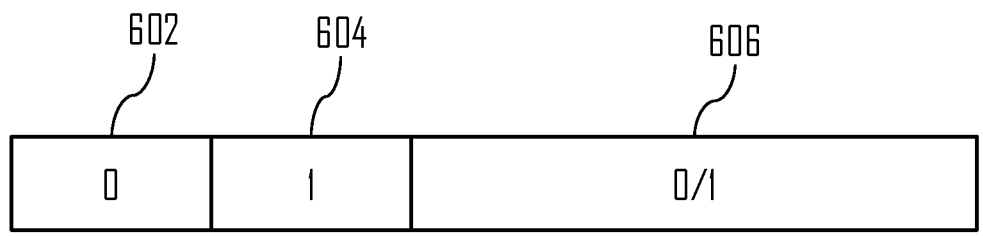

According to an embodiment, with reference to FIG. 6E, if the second information element 602 indicates (e.g. bit is 0) no candidate beam exceeding the predetermined threshold, the beam failure indication data further comprises a third information element 606 indicating an index of a TRP (or CORESETPoolIndex) associated with the partial beam failure. So, for example, in case the AC field is set to zero (i.e. no candidates that are associated with failed TRP, and with quality above the threshold) UE may encode at least one bitfield to indicate the failed TRP (e.g. first or last or any bit in the third information element 606) may be set to the value of failed TRP/CORESETPoolIndex.

So, in FIG. 6D there was at least one candidate beam and this may be indicated, by the UE to the network, by setting field 602 to 1 and indicating the one or more candidates in field 606. However, field 602 may be set to 0 if there are no candidates, and in this case field 606 may be used to indicate the TRP/CORESETPoolIndex that is associated with the partial beam failure. For example, one bit of the field 606 may be used. In general, the third information element may comprise a plurality of bits that can be used for indication purposes. For example, fields 602-606 may equal to one byte.

In an embodiment, if the SSB association to TRP/CORESETPoolIndex is known by the UE, UE selects CBRA resources corresponding to the failed TRP/CORESETPoolIndex and transmits the BFR MAC CE in Msg3 or in MsgA of 2-step RACH. The network may determine that the selected SSB is an implicit candidate for the TRP/CORESETPoolIndex. In such case there may be no need to transmit indication about the failed TRP/CORESETPoolIndex as it may be implicitly indicated to the network. In another embodiment, if the SSB association to TRP/CORESETPoolIndex is known by the UE, UE selects the CBRA resources on the non-failed (or functional) TRP/CORESETPoolIndex and indicates in the third information element 606 any SSB of the failed TRP/CORESETPoolIndex. This may also be understood, by the network, as an implicit indication about the failed TRP/CORESETPoolIndex. Candidate RS ID may be indicated implicitly if SSB association (or CSI-RE of DL-RS association) to a TRP is provided by the network to the UE. UE may select any SSB for the indication purpose. For example, if UE has been provided with association of random access resource/DL-RS that correspond to the RACH resource with a specific TRP/CORESETPoolIndex it may determine to select new candidate beam from the failed TRP based on said association. For example, the selected SSB may exceed a threshold value for it to be selected by the UE.

In an embodiment, with reference to FIG. 6D, the third information element 606 may not be encoded, and after successful delivery of the BFR MAC CE, UE is not required, by the network, to monitor CORESETs associated with the failed TRP/CORESETPoolIndex until reconfigured with new TCI states.

Alternatively, the UE may indicate the TRP/CORESETPoolIndex/failure detection resource set (e.g. in field 606) for which the failure was declared when it indicates the partial failure. Additionally, the field (i.e. field 606) may indicate a candidate RS for the failed TRP/CORESETPoolIndex.

In an embodiment, in any of the methods herein, UE indicates candidate RS (i.e. new candidate beam e.g. in field 606) with one or more of the following: Downlink RS, an SSB (or CSI-RS) index, TRP/CORESETPoolIndex specific RS index, an DL RS listed in a candidate RS list, a candidate listed in TRP specific candidate RS list.

Figure 6F:
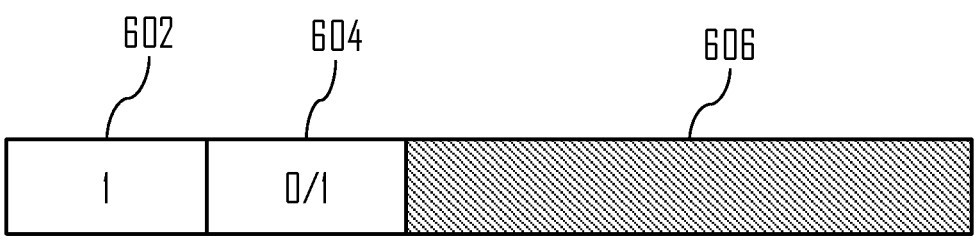
Figure 6H:
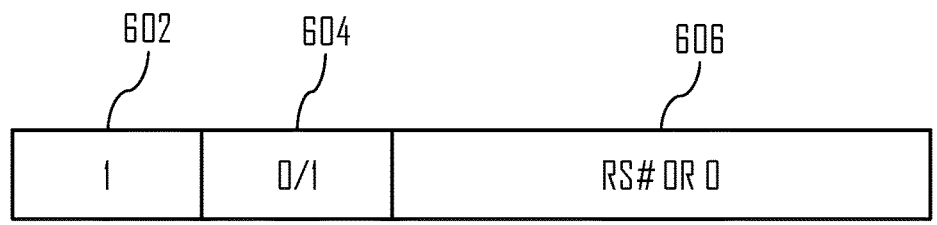

In an embodiment, with reference to FIGS. 6F and 6H, a second information element 602 (e.g. one bit) is used to indicate full or partial beam failure (0/1) on a given TRP/CORESETPoolIndex. In such case, a first information element 604 (e.g. one bit) may be used to indicate failed TRP/CORESETPoolIndex/failure detection resource set or whether or not there is a candidate beam exceeding a threshold available for the UE. In the example of FIG. 6F, second information element is used to indicate the TRP/CORESETPoolIndex/failure detection resource set. It is further possible to indicate candidate(s) in the third information element 606 (e.g. 6 bits) as shown in FIG. 6H. For example, the UE may be configured with candidate RS list or the SSBs or CSI-RS are associated with a TRP/CORESETPoolIndex/failure detection resource set. The network may thus determine the partial beam failure (i.e. which TRP/CORESETPoolIndex/failure detection resource set has failed) based on the association of the indicated candidate RS. Alternatively, if the second information element 602 is set to zero to indicate no candidate, at least one of the bits in the third information element 606 may encode the failed CORESETPoolIndex/failure detection resource set (i.e. indicate the failed TRP). It is noted at this point that the UE may ignore the pending SCell failure indication when indicating partial SpCell failure (either full or partial beam failure). That is, UE may not be required to report SCells that are in failure and may report the Scell failure in subsequent MAC CE.

Furthermore, above it was discussed that in some examples the UE may know or determine the SSB or CSI-RS to TRP/CORESETPoolIndex/failure detection resource set association. This association may be obtained from the network, for example, via Radio Resource Control (RRC) signaling and/or MAC CE. This RRC signaling may be specific RRC signaling, for example. For example, if there are 4 SSBs in a cell, SSB indexes #0 and #1 may be indicated to be associated with TRP0/recovery resources for CORESETPoolIndex equaling 0, and SSB indexes #2 #3 respectively for TRP1/recovery resource for CORESETPoolIndex equaling 1. In some examples it is possible that the SSBs belong to another cell (i.e. not serving cell), and thus the proposed solution may be applicable also for inter-cell M-TRP. For the network side, with reference to FIG. 5 and FIGS. 6A to 6H, the network node 104 may obtain the BFR MAC CE from the UE 100 with certain specific beam failure indication data. In one example, based on the first information element 604 in the beam failure indication data, the network node 104 may determine whether the UE has experienced partial or full beam failure.

In another example, if the first information element 604 indicates partial beam failure, the network node 104 may determine, based on a second information element 602 and/or a third information element 606 comprised in the beam failure indication data, a TRP/CORESETPoolIndex associated with the beam failure. Based on this information, the BFR may be continued or initiated by the network node 104.

The following list some example embodiments.

In an embodiment, when UE has determined a TRP specific failure at MAC layer, e.g. based on the set of q0_TRP0 and q0_TRP1 or has determined partial beam failure based on any TRP/CORESETPoolIndex specific failure detection mechanism, UE may trigger the TRP failure indication using, e.g., Random Access procedure in which the CBRA can be performed to recover from beam failure using the BFR MAC CE specified for SpCell failure.

In an embodiment, if multiple TRPs/CORESETPoolIndex(es) or partial beam failure detection is configured for the UE or, if a UE is configured by higher layer parameter PDCCH-Config that contains two different values of CORESETPoolIndex in ControlResourceSet, the additional byte for additional BFR information (i.e. the byte containing the SpCell AC, R and Candidate RS ID fields is present, or at least one byte carrying partial/multiTRP specific failure recovery information) for SpCell is present/encoded.

In an embodiment, UE encodes the fields according to the embodiments of this invention when it has been configured with more than one CORESETPoolindex values (UE is configured with multi-TRP so that at least 2 CORESETs on the active DL BWP have different CORESETPoolIndex values). in other words, when UE is configured with one CORESETPoolIndex, or is not configured with more than one CORESETPoolIndex, it encodes the (Truncated) BFR MAC CE as in section 2.

In an embodiment, the partial failure may be always the TRP associated with CORESETPoolIndex '0' or in other words, UE considers the partial failure detection based on the RS indicated by the active TCI State(s) for CORESETPoolindex '0'. As related example embodiment, UE is configured to report partial failure only on the CORESETs associated with CORESETPoolIndex '1' or '0'.

In an embodiment, when the UE reports the CORESETPoolIndex specific SpCell failure using a (Truncated) BFR MAC CE, UE could encode the MAC CE as follows (the additional byte is present carrying the SpCell specific information:

OPTION 1
  SP field indicates the failure on current SpCell.
  R field (used for indicating partial TRP failure) indicates that partial failure (TRP failure has occurred for the configured CORESETPoolindex).
    Whether UE reports TRP failure (failure is declared based of the BFD-RS associated with the CORESETs of CORESET PoolIndex) of Poolindex value 0 or 1, may be configured by network.
      the R field is set to '0' i.e. indicating that no partial failure is detected, network assumes that full failure (beam failure on all RS) has occurred.
  In an embodiment, only single TRP may be monitored for partial failure or TRP failure and when full failure is detected, UE does not set the R field.
  In an embodiment, the TRP monitored for partial failure is not the default TRP (CORESETPoolIndex 0) i.e. UE can be configured to report only partial failure on TRP with CORESETpoolIndex value '1'.
OPTION 2
  In an embodiment, UE is configured to report failure on the CORESETs associated with CORESET poolindex '1' or '0' i.e. UE monitors either partial failure of one TRP or it monitor the full failure. When the UE reports the CORESETPoolIndex specific SpCell failure using a (Truncated) BFR MAC CE, UE encodes the MAC CE as follows:
  SP field indicates the failure on SpCell
  R field indicates full/partial failure where a partial failure refers to TRP failure (RS associated with CORESETs under the same CORESETPoolIndex have failed).
  AC field options
    The AC field, based on the R field, indicates whether the failure occurred for CORESETPoolIndex value '0' or value '1'
      In one embodiment, if the SSB association to TRP is known to UE, UE selects CBRA resources corresponding to the failed TRP and network interprets the selected SSB as implicit candidate for the TRP.
      In another embodiment, if the SSB association is known to UE, UE selects the CBRA resources on the non-failed TRP and indicates I the candidate field any SSB of the failed TRP. candidate RS ID is indicated if SSB index association to TRP is provided by network, UE may select any SSB, or any SSB above a threshold for the failed TRP.

In yet one embodiment, the candidate RS ID field may not be encoded, and after successful delivery of MAC CE, UE is not required to monitor CORESETs associated with the failed poolIndex until reconfigured with new TCI states.

In an embodiment, if UE indicates whether UE reports CORESETPoolindex failure either based on the RS associated with poolindex value 0 or 1, may be configured by network.

In an embodiment, the UE indicates the TRP/CORESETPoolIndex for which the failure happened after it indicated the partial failure. Additionally, a candidate RS could be indicated for the given TRP/CORESETPoolIndex.

In an embodiment when UE indicates the partial beam failure (e.g. using the R field), the candidate RS field implicitly indicates the failed TRP/CORESETPoolIndex. In case the AC field is set to zero (i.e. no candidates that are associated with failed TRP, and with quality above the threshold), UE encodes at least one bitfield to indicate the failed TRP (e.g. first or last or any bit in the candidate RS field is set to the value of failed TRP/CORE SETPoolIndex).

OPTION 3

In an embodiment, the additional byte for the SpCell failure is encoded as follows:

BIT1: indicating partial failure or full failure

BIT2: if BIT1 indicated partial failure, the BIT2 indicates the failed TRP i.e. the CORESETPoolIndex that failed.

or BIT2: if BIT1 indicated partial failure, the BIT2 indicates if there is a candidate above threshold for a failed TRP, BIT3-BIT8: indicates the candidate RS index. Ue may be configured with candidate RS list or the SSBs are associated with a TRP, Network determines the partial beam failure (which TRP failed) based on the association of the candidate RS.

Alternatively, BIT3-BIT8: if AC field is set to zero to indicate no candidate, at least one of the bits in candidate RS field encodes the failed TRP ID (CORESETPoolIndex).

In an embodiment, UE may ignore the pending SCell failure indication when indicating partial SpCell failure i.e. it is not required to report SCells that are in failure and may report the Scell failure in sub sequent MAC CE.

In an embodiment, UE may be given the SSB association to a TRP for partial/TRP specific failure recovery in a specific RRC configuration:

In an embodiment, if there are 4 SSBs in the cell, SSB index #0 and #1 may be indicated to be associated with TRP0/recovery resources for CORESETPoolIndex #0 and #2 #3 respectively for TRP1/recovery resource for CORESETPoolIndex #1.

SSBs may also belong to another cell i.e. non-serving cell as in inter-cell MTRP.

In an embodiment, the methods described herein are applied when UE is configured with more than CORESETPoolIndex values and at least one of the CORESETS in a CORESETPoolIndex is associated with PDCCH reception from a non-serving cell (inter-cell MTRP).

In an embodiment, when the UE declares partial beam failure, it triggers BFR for SpCell and attempts to map the (Truncated) BFR MAC CE on an UL grant, if available; otherwise the UE triggers Scheduling Request procedure. In one option the UE can use the BFR SR resource associated with SCell BFR for requesting UL resources to transmit the BFR MAC CE with partial beam failure information.

Figure 7:
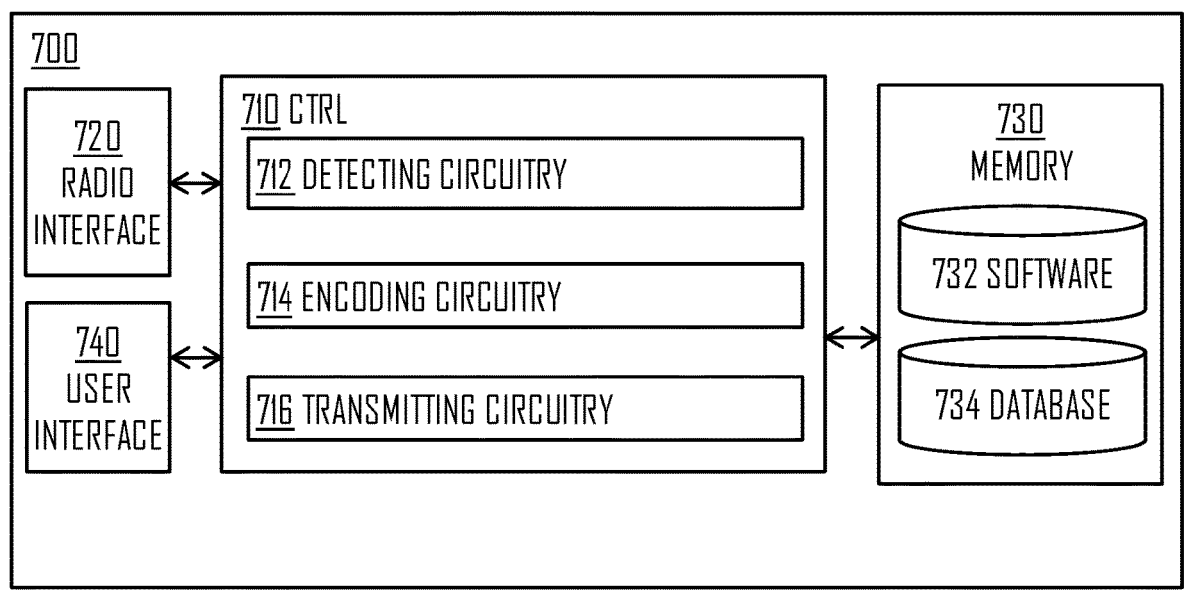
FIGS. 7 and 8 illustrate apparatuses according to some embodiments.
Figure 8:
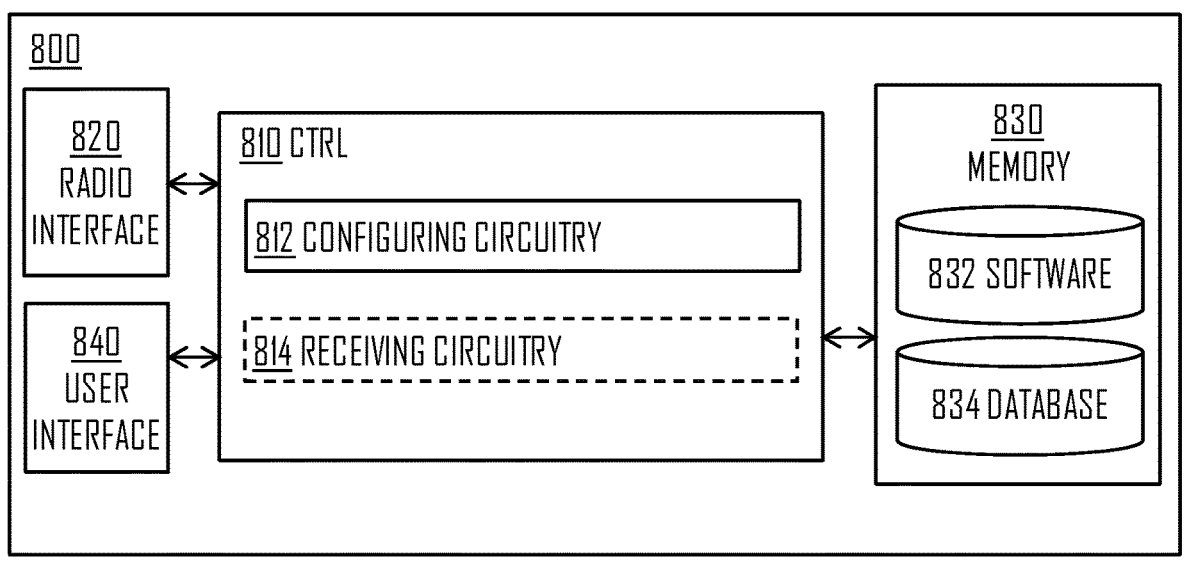

FIGS. 7 and 8 provide apparatuses 700, 800 comprising a control circuitry (CTRL) 710, 810, such as at least one processor, and at least one memory 730, 830 including a computer program code (software) 732, 832, wherein the at least one memory and the computer program code (software) 732, 832, are configured, with the at least one processor, to cause the respective apparatus 700, 800 to carry out any one of the embodiments of FIGS. 1 to 6H, or operations thereof.

Referring to FIGS. 7 and 8, the memory 730, 830, may be implemented using any suitable data storage technology, such as semiconductor based memory devices, flash memory, magnetic memory devices and systems, optical memory devices and systems, fixed memory and removable memory. The memory 730, 830 may comprise a database 734, 834 for storing data. For example, the configuration of the M-TRP and M-TRP beam failure indication may be stored to the database. For example, the network node 104 may configure the UE 100 to use a certain beam failure indication. This configuration may be stored, for example, by the UE 100 to the database and used accordingly before reconfiguration (e.g. new Transmission Configuration Indicator (TCI) states set by the network).

The apparatus 700, 800 may further comprise radio interface (TRX) 720, 820 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de)modulator, and encoder/decoder circuitries and one or more antennas. TRX may provide access to F1 and/or Xn interface, for example, and/or provide UL/DL communication capability. For example, the BFR MAC CE may be transmitted via the TRX.

The apparatus 700, 800 may comprise user interface 740, 840 comprising, for example, at least one keypad, a microphone, a touch display, a display, a speaker, etc. The user interface 740, 840 may be used to control the respective apparatus by a user of the apparatus 700, 800.

In an embodiment, the apparatus 700 may be or be comprised in a UE, e.g. the UE performing the method described above (e.g. see FIG. 2). For example, the apparatus 700 may be or be comprised in the UE 100 or UE 102.

In an embodiment, the apparatus 800 may be or be comprised in a network element, e.g. the network element performing the method described above (e.g. see FIG. 3). For example, the apparatus 800 may be or be comprised in the network node 104.

According to an embodiment, with reference to FIG. 7, the control circuitry 710 comprises a detecting circuitry 712 configured at least to perform operations described with respect to block 202 of FIG. 2; an encoding circuitry 714 configured at least to perform operations described with respect to block 204 of FIG. 2; and a transmitting circuitry 716 configured at least to perform operations described with respect to block 206 of FIG. 2.

According to an embodiment, with reference to FIG. 8, the control circuitry 810 comprises a configuring circuitry 812 configured at least to perform operations described with respect to block 302 of FIG. 3. Additionally, the control circuitry 810 may further comprise a receiving circuitry 814 configured at least to receive the BFR MAC CE from the UE or UEs.

In an embodiment, at least some of the functionalities of the apparatus 800 may be shared between two physically separate devices, forming one operational entity. Therefore, the apparatus 800 may be seen to depict the operational entity comprising one or more physically separate devices for executing at least some of the described processes. Thus, the apparatus 800 utilizing such shared architecture, may comprise a remote control unit (RCU), such as a host computer or a server computer, operatively coupled (e.g. via a wireless or wired network) to a remote radio head(s) (RRH), such as a TRP or TRPs, located in a base station or network node 104, for example. In an embodiment, at least some of the described processes may be performed by the RCU. In an embodiment, the execution of at least some of the described processes may be shared among the RRH and the RCU. For example, CU/DU split may utilize such shared architecture.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

According to an aspect there is provided a system comprising a plurality of apparatuses 700 and one or more apparatuses 800.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 6H may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 6H or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 6H, or operations thereof. The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 6H may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program. Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
at least one processor; and
at least one memory including computer program code;
the at least one memory and the computer program code configured to, with the at least one processor, cause the apparatus at least to perform:
detecting a beam failure on one transmission/reception point, TRP, the apparatus being configured to communicate with a plurality of TRPs of a cell, wherein each TRP of the plurality of TRPs is associated with a CORESETPoolIndex value, and each CORESETPoolIndex value is associated with at least one beam failure detection reference signal, BFD-RS, set, and wherein a beam failure on a TRP is determined based on a failure condition of the at least one BFD-RS set associated to the TRP;
based on the detecting, encoding a beam failure indication data to a beam failure recovery, BFR, media access control, MAC, control element, CE, wherein the beam failure indication data indicates the beam failure on one TRP of the plurality of TRPs, wherein the beam failure indication data comprises an information element indicating that the beam failure is partial in which beam failure is detected on one TRP of the plurality of TRPs and another information element indicating an index value of a TRP associated with the partial beam failure; and
transmitting the BFR MAC CE to a network element of the wireless communication network.

2. The apparatus of claim 1, wherein the BFR MAC CE is a BFR MAC CE or a truncated BFR MAC CE.

3. The apparatus of claim 1, wherein the BFR MAC CE is a CE configured for indicating a beam failure of a primary cell of a master cell group or a primary secondary cell of a secondary cell group.

4. The apparatus of claim 1, wherein the BFR MAC CE is transmitted in a contention based random access, CBRA, process.

5. The apparatus of claim 4, wherein the apparatus is further caused to perform:
triggering the CBRA process if the beam failure is detected on all of the plurality of TRPs, if the beam failure is detected on a default TRP, or if the beam failure is detected on a TRP configured to be monitored, by the apparatus, for a beam failure; otherwise not triggering the CBRA process to transmit the BFR MAC CE.

6. The apparatus of claim 1, wherein the BFR MAC CE is multiplexed to an available uplink grant or to an uplink grant obtained via a functional or non-failed TRP.

7. The apparatus of claim 1, wherein the apparatus is further caused to perform:
encoding, in the beam failure indication data, an information element indicating the cell in which the partial failure has taken place.

8. The apparatus of claim 1, wherein, in case of a partial beam failure, the beam failure indication data comprises an information element indicating whether there is a candidate beam exceeding a predetermined threshold.

9. The apparatus of claim 1, wherein the beam failure indication data further comprises an information element indicating a candidate beam detected by the apparatus.

10. An apparatus comprising:
at least one processor; and
at least one memory including computer program code;
the at least one memory and the computer program code configured to, with the at least one processor, cause the apparatus at least to perform:
configuring a user equipment, UE, of the wireless communication network to monitor beam failure on at least one of a plurality of transmission/reception points, TRPs, the UE being configured to communicate with the plurality of TRPs of a cell, wherein each TRP of the plurality of TRPs is associated with a CORESETPoolIndex value, and each CORESETPoolIndex value is associated with at least one beam failure detection reference signal, BFD-RS, set, and wherein a beam failure on a TRP is determined based on a failure condition of the at least one BFD-RS set associated to the TRP,
wherein the configuring causes the UE to encode, based on detecting a beam failure, beam failure indication data indicating a beam failure on one TRP of the plurality of TRPs to a beam failure recovery, BFR, media access control, MAC, control element, CE, and to transmit the BFR MAC CE to the wireless communication network;
obtaining, from the UE, the BFR MAC CE including beam failure indication data, wherein the beam failure indication data comprises an information element indicating that the beam failure is partial in which beam failure is detected on one TRP of the plurality of TRPs and another information element indicating an index value of a TRP associated with the partial beam failure; and
determining, based on the beam failure indication data, that the UE has experienced a partial beam failure.

11. A method for a user equipment, UE, of a wireless communication network, the method comprising:
detecting a beam failure on one transmission/reception point, TRP, the UE being configured to communicate with a plurality of TRPs of a cell, wherein each TRP of the plurality of TRPs is associated with a CORESETPoolIndex value, and each CORESETPoolIndex value is associated with at least one beam failure detection reference signal, BFD-RS, set, and wherein a beam failure on a TRP is determined based on a failure condition of the at least one BFD-RS set associated to the TRP;
based on the detecting, encoding a beam failure indication data to a beam failure recovery, BFR, media access control, MAC, control element, CE, wherein the beam failure indication data indicates the beam failure on one TRP of the plurality of TRPs, wherein the beam failure indication data comprises an information element indicating that the beam failure is partial in which beam failure is detected on one TRP of the plurality of TRPs and another information element indicating an index value of a TRP associated with the partial beam failure; and transmitting the BFR MAC CE to a network element of the wireless communication network.

* * * * *